Aug. 26, 1952 — B. E. STEVENS — 2,608,681

VOLTAGE REGULATION

Filed Jan. 21, 1949 — 2 SHEETS—SHEET 1

INVENTOR
B. E. STEVENS
BY
G. J. Heuerman
ATTORNEY

Aug. 26, 1952 — B. E. STEVENS — 2,608,681
VOLTAGE REGULATION
Filed Jan. 21, 1949 — 2 SHEETS—SHEET 2
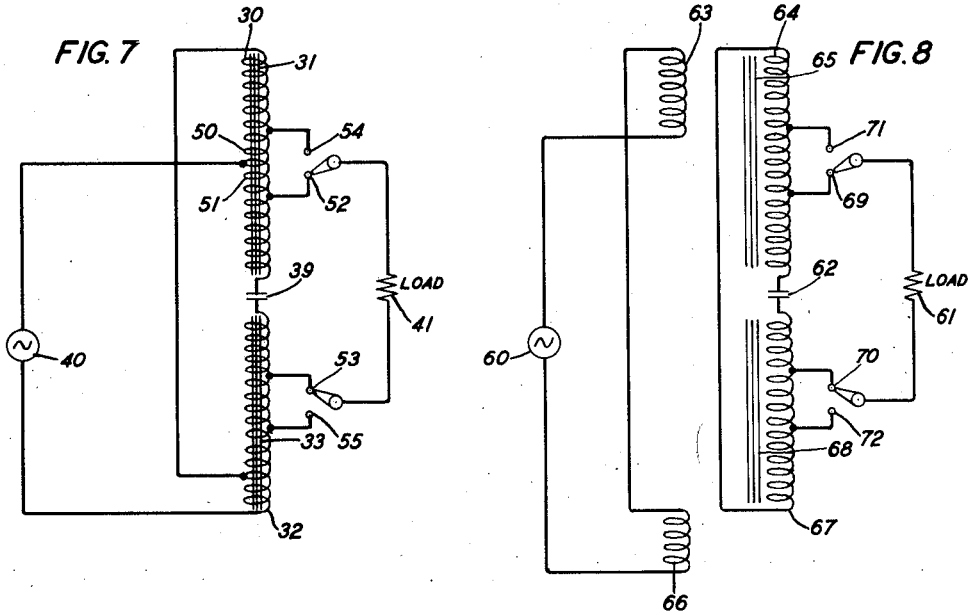
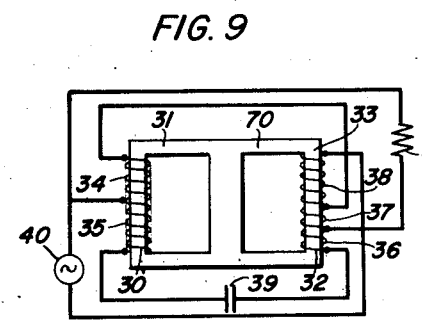
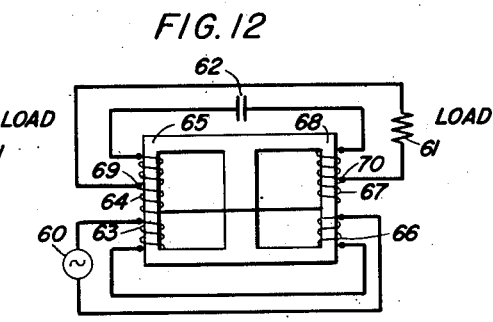
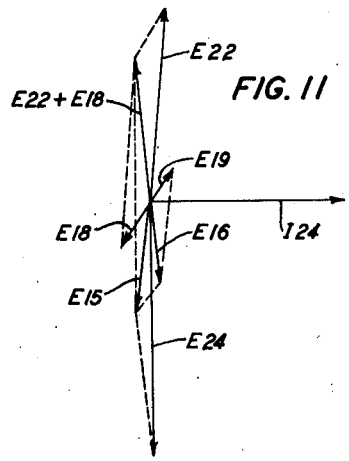
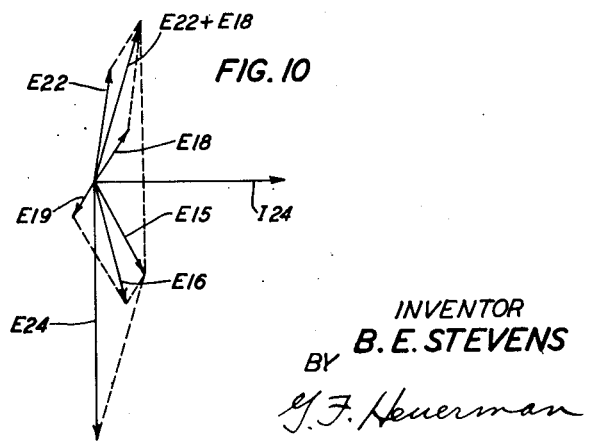
INVENTOR
B. E. STEVENS
BY
G. F. Heuerman
ATTORNEY Patented Aug. 26, 1952

2,608,681

UNITED STATES PATENT OFFICE 2,608,681

VOLTAGE REGULATION

Bruce E. Stevens, Closter, N. J., assignor to Bell Telephone Laboratories, Incorporated, New York, N. Y., a corporation of New York Application January 21, 1949, Serial No. 72,041

20 Claims. (Cl. 323—48)

1

This invention relates to current supply apparatus and particularly to apparatus for supplying current from an alternating-current supply source to a load and for maintaining the load voltage substantially constant.

An object of the invention is to provide an improved voltage-regulated alternating-current supply apparatus.

The current supply apparatus of the present invention is in some respects similar to that disclosed in my United States Patent No. 2,333,211, granted November 2, 1943 but is an improvement thereover. Some advantages of the voltage-regulated current supply apparatus of the present invention are relatively low cost, a high volt-ampere rating relative to size, low harmonic content of output current, a high input power factor, high efficiency, relative stability with frequency and temperature change and low heat generation.

In a preferred embodiment of the invention, there is derived from an alternating-current supply source an alternating voltage which is smaller than the voltage of the supply source and which varies in response to supply voltage changes, the percentage variation of the derived voltage being larger than the percentage variation of the supply line voltage and the phase of the derived voltage varying with respect to the phase of the supply voltage. A voltage equal to the vector sum of the supply voltage, or a voltage proportional to the supply voltage, and the derived voltage is impressed upon a load to maintain the load voltage substantially constant irrespective of voltage changes of the source. Preferably the derived voltage is so chosen that it is out of phase with respect to the line voltage by less than 90 degrees, the derived voltage decreasing as the line voltage increases, so that the resultant of the line voltage and the derived voltage is larger than either of the component voltages. If desired, the derived voltage having the decreasing characteristic as the line voltage is increased may be of larger magnitude than the line voltage and change at a smaller rate. In some cases, moreover, it may be desirable to employ a derived voltage which is out of phase with respect to the line voltage by a phase angle between 90 degrees and 180 degrees, the derived voltage increasing as the line voltage increases.

In order that the load voltage may have a desired root-mean-square value equal to, larger than or smaller than the nominal root-mean-square value of the line voltage, there may be included in the load circuit a second voltage derived from the supply source which is relatively

2 constant or which varies relatively slowly as the source voltage changes, the first derived voltage being adjusted to compensate for the variations of the second derived voltage as well as for the line voltage variations so that the load voltage remains substantially constant.

In a specific embodiment of the invention herein shown and described for the purpose of illustration, the apparatus provided for obtaining the derived voltage or voltages which is or which are in series with the supply voltage source and the load comprises a first and a second inductance device, each having a core of magnetic material and a winding thereon, and a condenser. The winding of the first device, the condenser and a portion of the winding of the second device are connected in that order in series with each other and with an alternating-current supply source to form a series ferro-resonant circuit operating above the jumping point of its characteristic current-voltage curve so that the capacitive reactance of the circuit is larger than its inductive reactance. A portion of the winding of the first device and the remaining portion of the winding of the second device are connected in a second circuit, which for convenience may be called a control circuit, in series with each other and with the supply source. The currents in said circuits, respectively, cause to be set up in the core of said first device magnetomotive forces which are opposing and, in the core of said second device, magnetomotive forces which are aiding. The magnetic flux in the core in which the aiding magnetomotive forces are set up is of sufficient magnitude to magnetize the core to a point above the knee of the magnetization curve and any effective air-gap in the magnetic circuit should be held to a minimum. The other core need not be operated above the knee of the magnetization curve. The magnetomotive force set up in each core due to the current in the ferro-resonant circuit rises relatively slowly or even decreases as the supply source voltage increases while the magnetomotive force set up in each core due to the current in the control circuit rises relatively rapidly as the supply voltage increases. The magnetomotive force due to the current in the ferro-resonant circuit is preferably larger than that due to the current in the control circuit for both inductance devices although the magnetomotive force due to the current in the ferro-resonant circuit may be smaller in the case of the first inductance device. The load circuit comprises in series the supply voltage source, a portion of the winding of the first inductance device and the load and it may also include a portion of the winding of the second inductance device. When the supply voltage rises, for example, the voltage across the portion of the winding of the first inductance device decreases sufficiently and changes in phase in response to the increase of the supply voltage to cause the load voltage to be maintained substantially constant.

In some cases it may be desirable to insulate the load or output circuit from the current supply source. For this purpose each inductance device may be provided with two windings which are insulated from each other. A winding of the first device and a winding of the second device are connected in series to the alternating-current supply source. The second winding of the first device, the condenser and the second winding of the second device are connected in series to form a series ferro-resonant circuit operating above the jumping point of its characteristic current-voltage curve, a voltage being induced into the ferro-resonant circuit due to the alternating current in the first winding of each inductance device. The load circuit is connected across a part of the ferro-resonant circuit comprising a portion of each of the windings in the ferro-resonant circuit and the condenser.

If desired, the two inductance devices may be combined by mounting the winding or windings of the one inductance device on one of the outer legs and the winding or windings of the other inductance device on the other outer leg of a three legged core structure.

The invention will now be described with reference to the accompanying drawing in which:

Figs. 1, 2, 3, 4, 10 and 11 are diagrams to which reference will be made in explaining the operation of the invention;

Figs. 6, 7, 8, 9 and 12 are schematic views of modifications of the voltage regulator depicted in Fig. 5.

Figure 1:
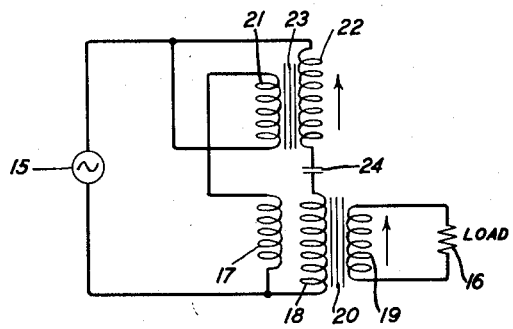
Figure 2:
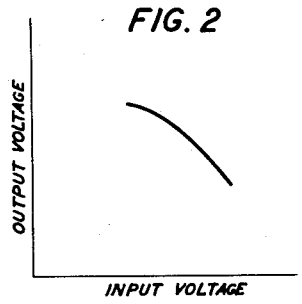

Referring to the drawing, there is shown in Fig. 1 a circuit arrangement for supplying alternating current from a supply source 15 to a load 16 to obtain an output or load voltage which decreases as the input or line voltage increases, as shown by the curve of Fig. 2. The circuit arrangement comprises a first inductance device having windings 17, 18 and 19 wound on a magnetic core 20 forming a closed magnetic path, a second inductance device having windings 21 and 22 on a magnetic core 23 forming a closed magnetic path and a condenser 24. Winding 22, condenser 24 and winding 18 are connected in series to the alternating-current supply source 15 to form a ferro-resonant circuit operating above the jumping point of its characteristic current-voltage curve, as described, for example, in my Patent No. 2,333,211, supra. A second circuit connected to the alternating-voltage source comprises windings 21 and 17 in series. The load 16 is connected to the winding 19. The circuit of Fig. 1 is similar in design to that shown in Fig. 3 of the United States Patent No. 2,297,672, granted to me September 29, 1942.

The magnetomotive forces set up in the magnetic circuit of core 23 by the currents in windings 21 and 22 are in aiding relationship and the magnetomotive forces set up in the magnetic circuit of core 20 by the currents in windings 17 and 18 are opposing. The ampere turns of winding 18 are greater than the ampere turns of winding 17. Since the current in the ferro-resonant circuit including winding 18 rises relatively slowly, or even decreases, in response to an increasing line voltage and since the current in winding 17 increases relatively rapidly in response to a line voltage increase, the resultant flux in the core 20 decreases in response to an increase of line voltage, and vice versa. Therefore, the load voltage decreases in response to an increase of line voltage and vice versa, as shown in Fig. 2. The rate of decrease of the load voltage can be greater than the rate of increase of the line voltage.

As the ratio of the ampere turns of winding 18 with respect to the ampere turns of winding 17 is increased, a point will be reached where an increase of the magnetomotive force due to a current increase in winding 18 will substantially equal the increase of magnetomotive force due to the current increase in winding 17, as the line voltage rises, so that the load voltage tends to become constant as the line voltage changes.

Figure 3:
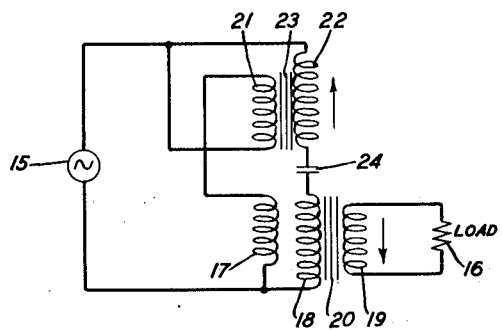
Figure 4:
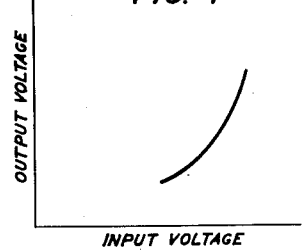

Fig. 3 is like Fig. 1, the corresponding parts having the same designation, except that the ampere turns of winding 17 are greater than the ampere turns of winding 18. Therefore, the phase of the resultant flux in core 20 is reversed as indicated by the arrow next to the core 20 and the load voltage will increase as the line voltage increases, and vice versa, as depicted by the curve of Fig. 4. The rate of increase of the load voltage can be greater than the rate of increase of the line voltage.

Figure 5:
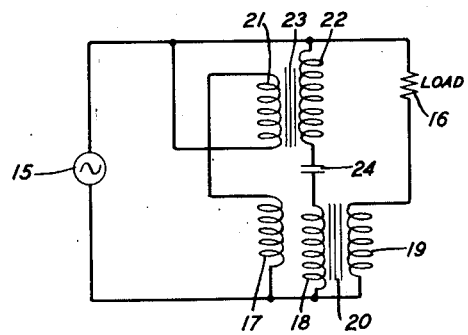
Fig. 5 is a schematic view of an alternating-current voltage regulator embodying the invention.

Fig. 5 is like Fig. 1 or Fig. 3, the corresponding parts bearing the same designations, with the following exception. Instead of connecting the load 16 across winding 19, as in Figs. 1 and 3, the load is connected in a circuit comprising winding 19 and the alternating-current source 15, all in series. As the line voltage changes, the magnitude and phase of the derived voltage across winding 19 will also change so that a resultant voltage equal to the vector sum of the line voltage and the derived voltage, which resultant voltage is impressed upon the load, remains substantially constant.

The operation of the regulator of Fig. 5 may be better understood from a consideration of the vector diagrams of Figs. 10 and 11. Preferably the ampere turns of winding 18 are greater than the ampere turns of winding 17. In this case the diagram of Fig. 10 is applicable. The current in the ferro-resonant circuit flowing through condenser 24 is designated by the vector I24 extending horizontally toward the right from the origin. The voltage E24 across the condenser lags the current I24 by 90 degrees. The voltage E22 and the voltage E18 across windings 22 and 18, respectively, each lead the current I24 by less than 90 degrees, the voltage E22 being larger than the voltage E18. The line voltage E15 which lags the current I24 by about 60 degrees is found by vectorially adding voltages E22, E18 and E24. The derived voltage E19 across winding 19 is opposed in phase to the voltage E18. The line voltage E15 and the derived voltage E19 are less than 90 degrees out of phase and the vector sum of these voltage components is the voltage E16 which is impressed across the load and which remains substantially constant irrespective of variations of the line voltage E15.

In some cases it may be desirable to have the ampere turns of winding 17 larger than the ampere turns of winding 18. In that case the vector diagram of Fig. 11 is applicable. The vectors I24 and E24 are the same in Fig. 11 as in Fig. 10 and the phase of vector 18 is now reversed with respect to its phase in Fig. 10. The line voltage E15 in Fig. 11 has the same magnitude as in Fig. 10 but lags the current I24 by somewhat more than 90 degrees. The derived voltage E19 has about the same magnitude as in Fig. 10. In Fig. 11, the line voltage E15 and the derived voltage E19 are more than 90 degrees out of phase with respect to each other so that the vector sum of these voltages, E16, is less in Fig. 11 than in Fig. 10. However, the load voltage E16 is maintained substantially constant irrespective of the line voltage variations.

Figure 6:
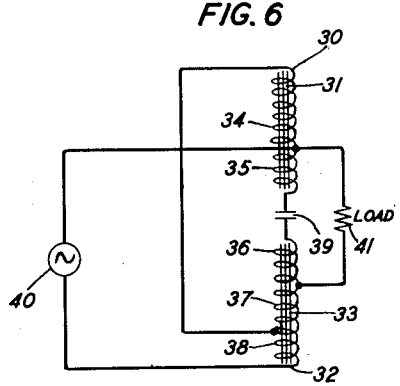

The regulator of Fig. 6 functions like the regulator of Fig. 5 but is simpler and less expensive. It comprises an inductance device comprising a single continuous winding 30 wound on a core 31 forming a closed flux path, a second inductance device comprising a single continuous winding 32 wound on a core 33 forming a closed flux path, and a condenser 39. Each of the coils has taps intermediate the end terminals of the coil. The winding 30 thus comprises two portions 34 and 35 and the winding 32 has three portions 36, 37 and 38. Current from an alternating-current source 40 is supplied through the regulator to a load 41 to maintain the load voltage substantially constant. The ferro-resonant circuit corresponding to the ferro-resonant circuit of Fig. 5 comprises the supply source 40, winding portion 35, condenser 39 and the entire winding 32, all in series. Winding portion 34 corresponds to winding 21 of Fig. 5 and winding portion 36 corresponds to winding 17 of Fig. 5, winding portions 34 and 38 being connected in series to the alternating-current source 40. There is provided a circuit comprising source 40, winding portions 36 and 37 and load 41, all in series. Thus, the derived voltage across portions 37 and 38 of winding 32 and the voltage of the supply source 40 are added vectorially to produce a resultant substantially constant voltage which is impressed upon the load 41. The derived voltage corresponds to a voltage across winding 19 of Fig. 5. The vector diagrams of Figs. 10 and 11 thus apply when it is borne in mind that the derived voltage of Fig. 6 corresponds to the voltage across winding 19 of Fig. 5.

Fig. 7 is like Fig. 6, the corresponding parts bearing the same numerals, but is designed to permit a portion 50 or 51 of winding 30 to be included in the load circuit in series with the source 40, a portion of winding 32 and the load 41. The terminals of load 41, respectively may be connected to coils 30 and 32 by way of taps 52 and 53 to provide a load voltage having a root-mean-square value greater than the nominal root-mean-square value of the line voltage or by way of taps 54 and 55 to provide a load voltage having a root-mean-square value equal to the nominal root-mean-square value of the line voltage. If desired, moreover, the taps 54 and 55 may be so chosen as to provide a load voltage having a root-mean-square value which is less than the nominal root-mean-square value of the line voltage. These results are obtained when the derived voltage across a portion of winding 32 has a decreasing characteristic as shown in Fig. 2.

In a specific regulating circuit of the type shown in Fig. 7, the nominal voltage of the supply source was 115 volts, 60 cycles, the capacitance of condenser 39 was 7½ microfarads, the lower portion of winding 30 which is in the ferro-resonant circuit had 155 turns, the remaining portion of winding 30 had 250 turns and the winding 32 had 405 turns. The lower portion of winding 32 which is connected in series with the upper portion of winding 30 to the source 40 had 120 turns, so that the remaining portion of winding 32 which is in the ferro-resonant circuit had 285 turns. The portions 50 and 51 of winding 30 each had 50 turns. The portion of winding 32 betwen the tap 53 and its lower terminal which is connected to a terminal of source 40 had 175 turns and the portion of winding 32 between tap 55 and its lower terminal had 155 turns. The winding 30 and the winding 32 were wound on the middle legs respectively of two three-legged cores. Each core structure comprised a 1½-inch pile up of 0.014-inch silicon steel laminations. The middle legs were 1⅜ inches wide and the outer legs were $\frac{11}{16}$ inch wide. The length of the mean magnetic path including the middle leg and one of the outer legs was 8¼ inches.

Fig. 8 shows a modification of the regulator described above in which the load circuit is insulated from the current supply source. Current is supplied from alternating-current source 60 to a load 61 through a regulator comprising two inductance devices and a condenser 62, the one inductance device comprising windings 63 and 64 having a core 65 and the other inductance device comprising windings 66 and 67 having a core 68. The load is connected to windings 64 and 67 by way of taps 69 and 70, respectively, or by way of taps 71 and 72, respectively, when the voltage across windings 66 and 67 have a decreasing characteristic. Winding 64, condenser 62 and winding 67 are conductively connected in series to form a ferro-resonant circuit operating above the jumping point of its characteristic current-voltage curve so that its capacitive reactance is greater than its inductive reactance. Windings 63 and 66 are insulated from windings 64 and 67 and are connected in series with each other to the supply source 60 as shown.

The regulator of Fig. 8 operates in the same manner as the regulator of Fig. 7 to maintain the load voltage substantially constant irrespective of voltage changes of the source. This may be better understood from the following analysis. The operation of Fig. 8 would not be changed if the upper terminals of windings 63 and 64, as viewed in the drawing, were conductively connected and if the lower terminal of winding 63 were conductively connected to a point of winding 64 between taps 69 and 71 such that the portion of winding 64 which is connected across winding 63 has the same number of turns as winding 63. Winding 63 and the portion of winding 64 connected across it would then be equivalent to the portion of winding 30 of Fig. 7 which is connected in series with a portion of winding 32 and the source 40. With this change in Fig. 8, the upper terminal of winding 66 will be conductively connected to the lower terminal of winding 67. Therefore, in the circuit as modified, a ferro-resonant circuit would comprise a lower portion of winding 64, condenser 62, winding 67, winding 66 and the source 60. The load circuit would comprise source 60, a small portion of winding 64 corresponding to portion 50 or portion 51 of Fig. 7, the load 61, a portion of winding 67 and winding 66, all in series. In Fig. 7 the derived voltage across a portion of winding 32 connected between a terminal of the supply source and a load terminal is added in series with the supply source voltage while in Fig. 8, as modified, the derived voltage across winding 66 and a portion of winding 67 is added in series with the supply source voltage. In Fig. 7 there is also included in the load circuit a voltage across a small portion of winding 30 connected between a terminal of the supply source and a terminal of the load while in Fig. 8, as modified, the voltage across a small portion of winding 64 is included in the load circuit.

The regulators of Figs. 5, 6, 7 and 8, employ entirely independent core structures for the windings of the inductance devices, respectively. However, the windings of the devices may be wound on the outer legs, respectively, of a three-legged core structure 70 as shown in Fig. 9. To facilitate comparison with Fig. 6, the corresponding parts in the two figures are designated by the same numerals. As in Fig. 6, winding portion 35, condenser 39 and winding 32 are connected in series to the supply source 40 to form a ferro-resonant circuit operating above the jumping point of its characteristic current-voltage curve. Winding portion 34 and winding portion 38 are connected in series to the source 40 to form a control circuit. The vector sum of the source voltage and the voltage across winding portions 37 and 38 is impressed across the load 41. The current in the ferro-resonant circuit and the current in the control circuit cause aiding magnetomotive forces to be produced in leg 31 of the three-legged core structure and cause opposing magnetomotive forces to be produced in the other outer leg 33. Either of the component magnetomotive forces in leg 33 may be larger than the other.

A modification of the embodiment of the invention of Fig. 8 is shown in Fig. 12, corresponding parts of the two figures being designated by the same numerals. A three-legged core structure is used in Fig. 12, windings 63 and 64 being wound on one of the outer legs 65 of the core structure and windings 66 and 67 being wound on the other outer leg 68.

What is claimed is:

1. In combination, a first and a second inductance device each comprising a core of magnetic material and a winding thereof, a condenser, a source of alternating current, a load, a first circuit comprising in series in the order named said source, the winding of said first device, said condenser and a portion of the winding of said second device, a second circuit comprising in series said source, a portion of the winding of said first device and a portion of the winding of said second device, and a third circuit comprising in series a portion of the winding of said first device, said condenser, a portion of the winding of said second device and said load.

2. In combination, a condenser, a first and a second winding wound on a first and a second core of magnetic material, respectively, a ferro-resonant circuit comprising said condenser and a portion at least of each of said first and second windings, all in series, a second circuit comprising a portion only of said first winding, said condenser, a portion only of said second winding and a load, all in series, and means for supplying alternating current from an alternating-current supply source to said ferro-resonant circuit to cause it to operate above the jumping point of its characteristic current-voltage curve so that its capacitive reactance is greater than its inductive reactance.

3. In combination, a condenser, a first and a second winding wound on a first magnetic core, a third and a fourth winding wound on a second magnetic core, a ferro-resonant circuit comprising said condenser and said second and fourth windings, all in series, means for supplying alternating current from a supply source to said first and third windings, the magnetomotive forces set up in said second core due to the currents in said third and fourth windings, respectively, being in opposition with respect to each other, said ferro-resonant circuit operating above the jumping point of its characteristic current-voltage curve so that its capacitive reactance is greater than its inductive reactance, and a load connected in a circuit comprising a portion only of said second winding, said condenser and a portion only of said fourth winding.

4. In combination, a first, a second, a third and a fourth winding, said first and second windings having a common magnetic core and said third and fourth windings having a common magnetic core, a condenser, a ferro-resonant circuit comprising said condenser and said second and fourth windings, all in series, a load connected in a circuit comprising a portion only of said second winding, said condenser and a portion only of said fourth winding, and means for supplying alternating current from a supply source to said first and third windings in series to cause a current to flow in said ferro-resonant circuit, the currents flowing in said first and second windings, respectively, causing aiding magnetomotive forces to be set up in the common core for said first and second windings, the currents flowing in said second and fourth windings, respectively, causing opposing magnetomotive forces to be set up in the common core for said third and fourth windings, said ferro-resonant circuit operating above the jumping point of its characteristic current-voltage curve so that its capacitive reactance is greater than its inductive reactance.

5. In combination, a first, a second, a third and a fourth winding, a first circuit comprising said first and third windings connected to an alternating-current supply source, a condenser, a second circuit insulated from and magnetically coupled to said first circuit, and said second circuit comprising said second and fourth windings and said condenser forming a series ferro-resonant circuit operating above the jumping point of its characteristic current-voltage curve so that said ferro-resonant circuit has a capacitive reactance greater than its inductive reactance, and means for connecting a load across a portion of said ferro-resonant circuit.

6. A combination in accordance with claim 5 in which the currents flowing in said first and second windings cause aiding magnetomotive forces to be set up in a magnetic circuit for said first and second windings and in which the currents flowing in said third and fourth windings cause opposing magnetomotive forces to be set up in a magnetic circuit for said third and fourth windings and in which said load is connected in a circuit comprising a portion only of said second winding and a portion only of said fourth winding, said two winding portions and said load all being in series.

7. In combination, a three-legged core of magnetic material, a first and a second winding on the outer legs, respectively, of said core, a condenser, a circuit comprising a portion only of said first winding, said condenser and said second winding and a source of alternating current, all in series, a second circuit comprising another portion only of said first winding, a portion only of said second winding and said source, all in series, a load, and a third circuit comprising said load, a portion only of said second winding and said source, the currents flowing in said first and second circuits, respectively, causing opposing magnetomotive forces to be produced in the leg of said core upon which said second winding is wound.

8. In combination, a three-legged core of magnetic material, a first and a second winding on one of the outer legs of said core, a third and a fourth winding on the other outer leg of the core, a first circuit comprising said first and third windings and a source of alternating current, all in series, a condenser, a second circuit insulated from said first circuit comprising said second and fourth windings and said condenser, all in series, and a load circuit connected across a portion of said second circuit which comprises a portion only of said second winding, said condenser and a portion only of said fourth winding.

9. In combination, a first and a second winding each for setting up flux in a core of magnetic material, a ferro-resonant circuit comprising a condenser, a portion at least of each of said windings and a supply source of alternating current all connected in series, said ferro-resonant circuit operating above the jumping point of its characteristic curve so that said ferro-resonant circuit has a capacitive reactance greater than its inductive reactance, a second circuit comprising a portion of each of said windings and said alternating-current source all connected in series, whereby there is set up across a portion at least of said first winding a derived alternating voltage the root-mean-square value of which decreases in response to an increase of the root-mean-square value of the voltage of said source, and vice versa, a load, and means for impressing across said load a resultant voltage having as components the voltage of said source and said derived voltage.

10. The combination with an alternating-current supply source and a load, of a ferro-resonant circuit coupled to said supply source to be energized therefrom, said ferro-resonant circuit comprising a first and a second winding each for setting up flux in a core of magnetic material and a condenser, said ferro-resonant circuit operating above the jumping point of its characteristic current-voltage curve so that its capacitive reactance is greater than its inductive reactance, and a circuit comprising a portion of said first winding, said condenser, a portion of said second winding and said load, all in series, whereby a substantially constant voltage is impressed across said load.

11. The combination with an alternating-current supply source and a load, of a ferro-resonant circuit coupled to said supply source to be energized therefrom, said ferro-resonant circuit comprising a first and a second winding each for setting up flux in a core of magnetic material and a condenser, said ferro-resonant circuit operating above the jumping point of its characteristic current-voltage curve so that its capacitive reactance is greater than its inductive reactance, a second circuit for supplying current from said source to said first and second windings, and means for supplying current from said source to said load through a circuit comprising said source, said load and a portion of said first winding, all in series.

12. In combination, a first and a second winding each for setting up flux in a core of magnetic material, a condenser, a source of alternating-current, a load, a first circuit comprising in series in the order named said source, said first winding, said condenser and a portion only of said second winding, a second circuit comprising in series said source, a portion only of said first winding and a portion only of said second winding, and a third circuit comprising in series a portion only of said first winding, said condenser, a portion only of said second winding and said load.

13. A combination in accordance with claim 12 in which there is provided a three-legged core, said first and second windings being wound on different legs, respectively, of said core.

14. A combination in accordance with claim 12 in which said first circuit is a ferro-resonant circuit operating above the jumping point of its characteristic current-voltage curve so that said ferro-resonant circuit has a capacitive reactance greater than its inductive reactance.

15. In combination, a first winding and a second winding each for setting up flux in a core of magnetic material, each of said windings having a first, a second and a third terminal, said third terminal being intermediate said first and second terminals, means for conductively connecting said first terminal of said first winding to said first terminal of said second winding, a condenser, a first current path comprising said condenser connecting said second terminal of said first winding and said second terminal of said second winding, a load, a second current path comprising said load connecting said third terminal of said first winding and said third terminal of said second winding, and means for causing alternating voltages to be set up across said first and second windings and said condenser, respectively, to thereby control the supply of alternating current to said load.

16. A combination in accordance with claim 15 in which said means for causing alternating voltages to be set up across said first and second windings and said condenser, respectively, comprises a third winding magnetically coupled to said first winding, a fourth winding magnetically coupled to said second winding, and means for connecting said third and fourth windings in series to an alternating-current supply source.

17. A combination in accordance with claim 15 in which said means for causing alternating voltages to be set up across said first and second windings and said condenser, respectively, comprises a source of alternating-current, means for connecting one terminal of said source to a terminal of said first winding intermediate said first and second terminals, and means for connecting a second terminal of said source to a fourth terminal of said second winding, said first and third terminals of said second winding being intermediate said second and fourth terminals thereof.

18. In combination, a first winding means for setting up flux in a core of magnetic material, a second winding means for setting up flux in a core of magnetic material, a condenser, an alternating-current supply source, a load, a ferro-resonant circuit coupled to said supply source to be energized therefrom, said ferro-resonant circuit comprising a portion at least of each of said first and second winding means and said condenser all in series, said ferro-resonant circuit operating above the jumping point of its current-voltage curve so that its capacitive reactance is greater than its inductive reactance, a second circuit for supplying current from said source to said first and second winding means, and means for supplying current from said source to said load through a circuit comprising said source, said load and a portion of one at least of said first and second winding means, all in series.

19. In combination, a first and second winding means for setting up fluxes in magnetic circuits, respectively, when current is supplied to said winding means, a condenser, an alternating-current supply source, a load, a first circuit comprising in series said source and a portion of each of said winding means, a second circuit comprising in series said source, said condenser and a portion at least of each of said winding means, said second circuit being a ferro-resonant circuit operating above the jumping point of its characteristic current-voltage curve so that said ferro-resonant circuit has a capacitive reactance which is greater than its inductive reactance, and a third circuit comprising in series said source, a portion of said first winding means and said load, the ampere turns of said first winding means in said second circuit being larger than the ampere turns of said first winding means in said first circuit.

20. In combination, a first winding means having a first and a second winding portion each wound on a core of magnetic material, a second winding means having a third, a fourth and a fifth winding portion each wound on a core of magnetic material, an alternating-current supply source, a condenser, a load, means for supplying current from said source to said first and third winding portions in series, means for supplying current from said source to a circuit comprising said second and fourth winding portions and said condenser all in series, said circuit being a series ferro-resonant circuit operating above the jumping point of its characteristic current-voltage curve so that its capacitive reactance is greater than its inductive reactance, and a circuit comprising said source, said fifth winding portion and said load all in series, said first and second winding portions producing aiding magnetomotive forces in the core for said first winding means, said third and fourth winding portions producing opposing magnetomotive forces in the core for said second winding means.

BRUCE E. STEVENS.

REFERENCES CITED

The following references are of record in the file of this patent:

UNITED STATES PATENTS

| Number | Name | Date |
|---|---|---|
| 2,221,456 | Pohm | Nov. 12, 1940 |